B. SMITH.
Cotton Planter.
No. 105,006.  Patented July 5, 1870.
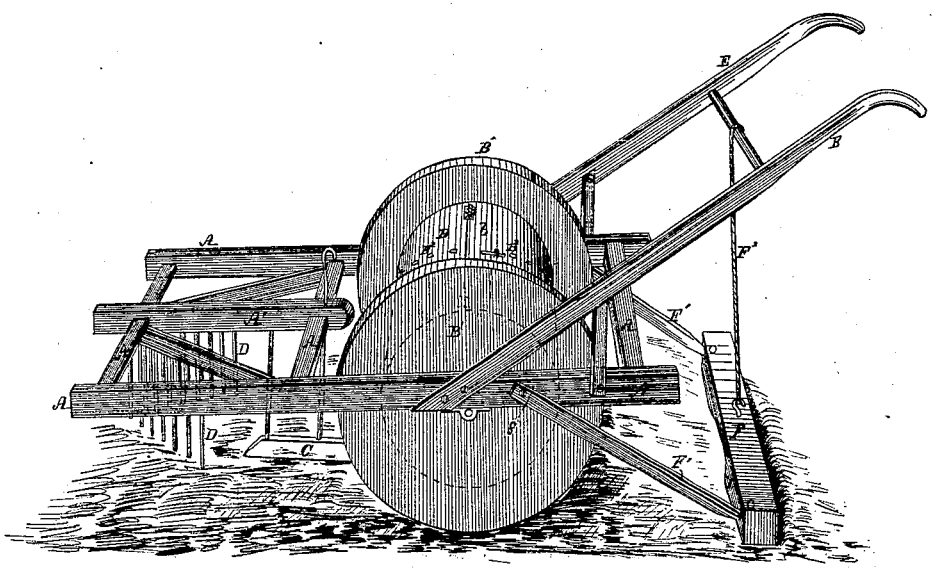

United States Patent Office.

BARTEMUS SMITH, OF HOOD SWAMP, NORTH CAROLINA.

Letters Patent No. 105,006, dated July 5, 1870.

IMPROVEMENT IN COTTON-SEED PLANTERS.

The Schedule referred to in these Letters Patent and making part of the same.

*To all whom it may concern:*

Be it known that I, BARTEMUS SMITH, of Hood Swamp, in the county of Wayne, and in the State of North Carolina, have invented a new and useful Improvement in Cotton-seed Planters; and I do hereby declare that the following is a full, clear, and exact description thereof, reference being had to the annexed drawing making part of this specification, in which—

The figure represents a perspective view of my improved cotton-planter.

This invention relates to cotton-planters; and

My improvements consist in the construction, combination, and arrangement of various parts of the machine, as will be more fully set forth in the following specification and claims.

The frame of the planter, marked A in the figure, has a rectangular form, and is composed of longitudinal and transverse beams firmly bolted together.

In the rear portion of this frame, the cylindrical seed-box B has its bearings, its heads $B'$ being provided for this purpose with short journals which rest in boxes secured under such frame.

The cylindrical seed-receptacle is made of sheet-metal, or other suitable material, and has a door, $b$, through which to introduce the seed, which is discharged through a series of openings, $B^2$, as the cylinder revolves, such openings being arranged midway between its ends, and in one vertical plane, at such distance apart as to drop the seed at suitable intervals.

The ends of the seed-cylinder are closed by the heads $B^1$, which are made considerably larger in diameter than the former, and serve as wheels to support the other parts of the machine.

In line with the openings $B^2$ in the seed-cylinder, and directly in front thereof, the colter or plow C is arranged pendent from the center beam $A'$ of the frame. It opens a furrow in the "bed" as the machine is drawn along, into which the seed is dropped.

A harrow, D, represented V-shaped in this instance, is attached to the front portion of the frame, which pulverizes the earth, and thus puts it in a more favorable condition for the reception of the seed.

E E represent the handles, which may be of any convenient form, and attached to the frame in the usual manner.

F represents the coverer suspended in rear of the seed-cylinder from the frame by arms, $F^1$, pivoted at $f$ to such frame. It is simply a squared piece of timber, a little hollowed out in its central portion in front, so as to enable it to push the earth thrown up by the plow back into the furrow to cover the seed.

A cord or chain, $F^2$, is attached to it, by which it may be lifted from the ground by the operator.

Having thus described my invention,

What I claim, and desire to secure by Letters Patent, is—

The cylindrical-seed-box B, with heads $B^1$, plow C, harrow D, coverer F, attached to pivoted arms $F^1$, cord or chain $F^2$, and frame A, all combined and arranged as described.

The above specification signed my me this 17th day of January, 1870.

BARTEMUS SMITH.

Witnesses:
A. B. KINSEY,
OWEN PEEL.